Sept. 3, 1963
K. WILFERT
3,102,755
SEAT COVER FOR MOTOR VEHICLES
Filed Sept. 26, 1960
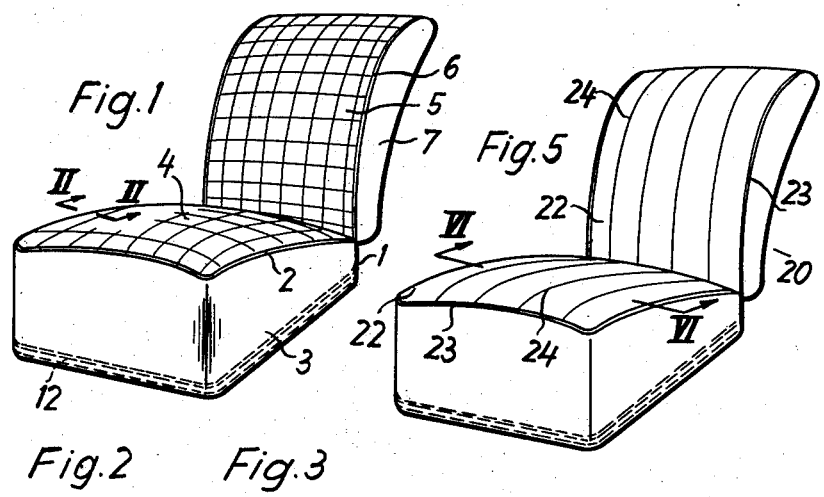
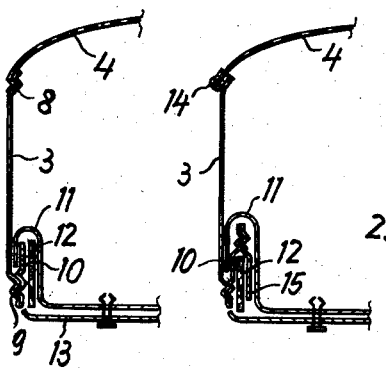
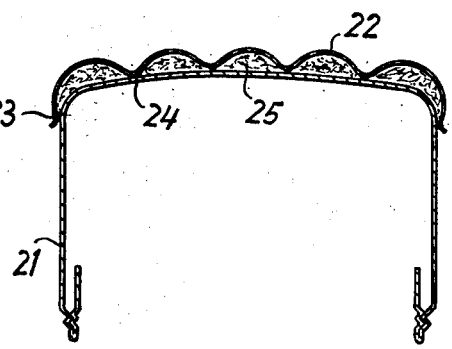
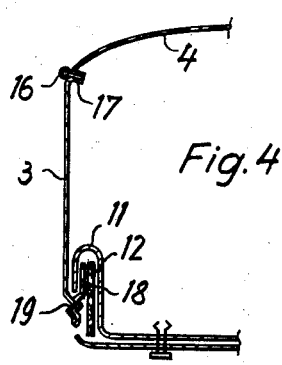
INVENTOR
KARL WILFERT
BY *Dicke, Craig & Freudenberg*
ATTORNEYS United States Patent Office 3,102,755
Patented Sept. 3, 1963

3,102,755
SEAT COVER FOR MOTOR VEHICLES
Karl Wilfert, Stuttgart-Degerloch, Germany, assignor to Daimler-Benz Aktiengesellschaft, Stuttgart-Unterturkheim, Germany
Filed Sept. 26, 1960, Ser. No. 58,264
2 Claims. (Cl. 297—229)

The present invention relates to improvements in seat covers for the seats of motor vehicles, which term is intended to include both the permanent covering of the upholstery of the seats as well as protective covers which may be slipped over the permanent covering.

It is already known that thermoplastic materials may be combined with other materials which do not have thermoplastic properties, and more particularly that an upholstery may be produced of several layers by combining a layer of upholstery material with a layer of thermoplastic material. Moreover, it is known to provide a padding material between a cloth base and a covering of upholstery material and also to produce upholstery covers of a sheeting of synthetic resin, for example, polyvinyl chloride.

By experience it has, however, been found that for covering the actual seat surfaces and the front surfaces of the back rest plastic materials are for various reasons not so desirable as the usual covering materials, such as cloth. A seat cover both of the permanent and the slip-on type has therefore usually been designed so that the seat surface thereof consists of cloth which is sewed along the sides thereof to a strip or strips of plastic material which cover the lateral parts of the seat. In some seat covers it is also known to provide lower securing edges into which strips of a flexible material, for example, cardboard, are inserted and sewed thereto. Apart from the fact that the sewing of the cloth or of the inserted strips to the plastic material is rather complicated and requires considerable time, the plastic material easily tears along the stitched seams.

It is an object of the present invention to overcome the above-mentioned disadvantages of the known plastic seat covers and to provide a covering for the seat of a motor vehicle which combines the advantages of plastic materials, namely, their solidity and their quality of being easily worked and cleaned with the advantages of textile fabrics of being soft and porous. A further object of the invention is to provide a new manner of connecting the textile material to the plastic material, as well as adjacent plastic portions to each other, and also the plastic portions to the frame of the seat, which may be carried out very easily and inexpensively and results in very secure connections between the respective parts.

The seat covers according to the invention are of the type in which at least the lateral surfaces of the cover consist of sheeting of synthetic resin, for example, polyvinyl chloride and in which the actual seat part and the part covering the front of the back rest consist of cloth inserts or cloth top layers which are connected to the plastic material merely by welding.

An essential feature of the invention consists in providing a seat cover in which the entire seat surface as well as the entire front surface of the back rest is covered with a layer of textile fabric which is uniformly divided by means of parallel welding seams, and in which a suitable padding material is inserted between the layers of textile and plastic materials covering the mentioned parts of the seat and such padding material is held in a fixed position between these layers by the mentioned welding seams.

Another feature of the invention provides that the seat cover is to be secured within a groove in the seat frame which extends along the lower lateral edges of the seat, and that the part of the seat cover which is so secured to the frame of the seat consists of a strip of plastic material which engages into the groove in the frame. Furthermore, the invention provides that the part of the seat cover which is thus secured to the frame preferably consists of an inwardly folded marginal strip, the folded or attached edge of which is reinforced by a welded seam, while the free edge portion thereof engages into the groove of the frame from below.

It has further been found to be of great advantage if, after the marginal strip has been inserted into the groove of the frame, another strip consisting of a flexible material is also inserted into the groove so as to hold the marginal strip more securely therein.

For further improving the manner of securing the seat cover, the invention further provides that the marginal strip is extended by another strip of approximately the same width and extending parallel thereto which is welded to the free edge of the marginal strip and surrounds the inserted strip at the side facing toward the seat. The inserted strip may then preferably be additionally secured within the groove by means of clamps which are secured to the seat frame so as to be easily removable therefrom.

The above-mentioned object of the invention will be very advantageously attained by the new manner of producing a seat cover since it permits a very simple and economical manufacture. Furthermore, the cover which is thus produced considerably solidifies and reinforces the basic structure of the entire upholstery of the seat. The particular construction of the seat cover according to the invention and the special provision of welding seams also prevents the padding material within the cover from slipping. The combination of the plastic material with a textile material also has the advantage that, while the porosity and softness of the textile material of the actual seat surface renders the same more comfortable, the plastic material and the welded seams between the different parts of the cover solidify the entire cover structure. This also applies particularly to the welded seams themselves which are much more secure than stitched seams and which, instead of weakening the material as by stitching, actually reinforce both the textile and plastic parts to which they are applied.

These objects, features, and advantages of the present invention will become further apparent from the following detailed description thereof, particularly when the same is read with reference to the accompanying drawings, in which—

FIGURE 1 shows a perspective view of an upholstered seat for a motor vehicle with a cover according to a first embodiment of the invention;

FIGURE 2 shows a partial section taken along line II—II of FIGURE 1;

FIGURE 3 shows a partial section similar to that according to FIGURE 2, but of a modification of the invention;

FIGURE 4 shows another partial section similar to that according to FIGURE 2, but of a further modification of the invention;

FIGURE 5 shows a perspective view of an upholstered seat with a cover according to a further modification of the invention; while FIGURE 6 shows a cross section of the cover of the seat according to FIGURE 5 taken along line VI—VI thereof.

Referring first to FIGURE 1 of the drawings, a seat 1 for a motor vehicle is provided with a cover, the seat portion 4 of which consists of a textile fabric which is secured along the outer edges 2 by welding to the lateral part 3 which consists of a plastic material. The surface 5 covering the front part of the back rest likewise consists of a textile fabric and is likewise secured by welding along the outer edges 6 to an adjacent part 7 of plastic material which covers the sides of the back rest. This welding operation consists of a heat treatment which softens the plastic material.

As illustrated in FIGURE 2, the plastic part 3 overlaps the textile part 4 so that the welding seam 8 which connects the two parts appears to the outside as a decorative line. At its lower edge which is used for securing the cover to the seat the plastic part 3 is folded inwardly and maintained in this shape by a welding seam 9 which extends along the folded edge. The free marginal strip 10 of the folded portion which is relatively rigid engages from below into a groove 11 in the lower part of the frame of the seat and is held in groove 11 by a strip 12 which is additionally inserted into groove 11 and consists of a flexible material, for example, cardboard. This inserted strip 12 is, in turn, held in groove 11 by clamps 13 which are secured to the seat frame in a manner so as to be easily removable therefrom.

As shown in FIGURE 3, the textile part 4 may also overlap the plastic part 3 and be welded thereto along the outer edges 2, and a trimming 14 of plastic material may be welded thereto at the same time. The lower strip 10 which serves for securing the cover may also be welded at its free end to a substantially similar relatively rigid strip 15 which encloses the inserted strip 12 at the side facing toward the seat and thereby maintains the cover very securely within groove 11 of the lower frame of the seat.

The seat cover according to a further embodiment of the invention, as illustrated in FIGURE 4, is provided along the line of connection between the textile part 4 and the plastic part 3 with a welded-in bead 16 which is made of plastic sheet material. The welding seam 17 is arranged in this embodiment so as to extend toward the inside of the cover and to be visible from the outside only by the edge of the seam from which bead 16 projects toward the outside. There is no necessity to provide a corrugated welding seam 9 along the edge of the fold of the lower folded marginal strip, but as shown in FIGURE 4, the marginal strip 18 may be produced by welding a single seam 19 closely adjacent to the folded edge.

A further embodiment of the invention is shown in FIGURES 5 and 6, in which the seat 20 of a vehicle is provided with a cover which consists of a continuous part 21 of plastic material, while the actual seat surface and the front surface of the back rest are covered at the outside with cloth 22. The cloth covering 22 is welded to the plastic part not only along the outer edges 23 of the actual seat surface and the front surface of the back rest, but it is also welded thereto along several welding seams 24 which divide the cloth surface into several parts. This seat cover is further provided with a layer of upholstery between the textile covering and the part of the plastic covering underneath the textile covering. This upholstery is produced by pockets which are formed by the different welding seams 23 and 24 between the textile covering 22 and the plastic part, and by a filling of padding material 25, for example, upholstery cotton, which is held in place within the pockets by the welding seams 23 and 24.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A seat assembly especially for motor vehicles comprising a stuffed seat including a seat portion and a backrest, a seat frame, a permanent continuous cover for said seat, said cover consisting of a layer of plastic material covering said seat portion and said backrest substantially at all visible external surfaces thereof, a soft porous fabric layer overlying said plastic layer only at the actual seat surface of said seat portion and at the surface of said backrest facing toward said seat surface, said fabric layer being secured to said plastic layer by welding seams extending across said seat surface and connecting said fabric layer with said plastic layer and dividing said seat surface into a plurality of substantially uniform pockets intermediate said layers, and padding material within said pockets retained therein by said welding seams, said plastic layer at the lower lateral edges thereof adjacent the bottom of said seat being provided with an upwardly extending strip secured thereto by welding, said seat frame including means defining a vertically extending groove in the edges thereof opening downwardly, said strip being arranged within said groove and adapted to secure said cover to said seat frame, and means for holding said strip in said groove including a strip of cardboard-like material arranged in said groove adjacent said strip and clamp means for holding said cardboard-like strip in said groove secured to said seat frame.

2. A seat assembly especially for motor vehicles comprising a stuffed seat including a seat portion and a backrest, a seat frame, a permanent continuous cover for said seat, said cover consisting of a layer of plastic material covering said seat portion and said backrest substantially at all visible external surfaces thereof, a soft porous fabric layer overlying said plastic layer only at the actual seat surface of said seat portion and at the surface of said backrest facing toward said seat surface, said fabric layer being secured to said plastic layer by welding seams extending across said seat surface and connecting said fabric layer with said plastic layer and dividing said seat surface into a plurality of substantially uniform pockets intermediate said layers, and padding material within said pockets retained therein by said welding seams, said plastic layer at the lower lateral edges thereof adjacent the bottom of said seat being provided with an upwardly extending strip having one edge secured to said layer by welding and a second downwardly extending strip secured to the upper edge of said upwardly extending strip, said seat frame including means defining a vertically extending groove in the edges thereof opening downwardly, said upwardly extending strip and said second strip being arranged within said groove and adapted to secure said cover to said seat frame, and means for holding said strips in said groove including a strip of cardboard-like material arranged in said groove between said upwardly extending strip and said second strip, and clamp means for holding said cardboard-like strip in said groove secured to said seat frame.

References Cited in the file of this patent

UNITED STATES PATENTS

| | | |
|---|---|---|
| 1,256,364 | Pedersen | Feb. 12, 1918 |
| 1,533,973 | Cohen et al. | Apr. 14, 1925 |
| 2,072,243 | Clark | Mar. 2, 1937 |
| 2,222,052 | Vanderploeg | Nov. 19, 1940 |
| 2,619,156 | Seaman | Nov. 25, 1952 |
| 2,646,840 | Good | July 28, 1953 |
| 2,796,116 | Wilfert | June 18, 1957 |

FOREIGN PATENTS

| | | |
|---|---|---|
| 1,001,789 | France | Oct. 21, 1951 |
| 1,032,167 | France | Mar. 25, 1953 |
| 296,304 | Switzerland | Apr. 17, 1954 |
| 159,520 | Australia | Oct. 28, 1954 |
| 943,570 | Germany | May 24, 1956 |
| 817,609 | Great Britain | Aug. 6, 1959 |
| 834,298 | Great Britain | May 4, 1960 |
| 839,143 | Great Britain | June 29, 1960 |